United States Patent
Wines et al.

(10) Patent No.: US 10,557,356 B2
(45) Date of Patent: Feb. 11, 2020

(54) COMBINED BALANCE WEIGHT AND ANTI-ROTATION KEY

(71) Applicant: General Electric Company, Schenectady, NY (US)

(72) Inventors: Daniel Edward Wines, Cincinnati, OH (US); Harsha Prakash, Bangalore (IN); Kandukuri Chandrashekhar, Bangalore (IN)

(73) Assignee: General Electric Company, Schenectady, NY (US)

( * ) Notice: Subject to any disclaimer, the term of this patent is extended or adjusted under 35 U.S.C. 154(b) by 596 days.

(21) Appl. No.: 15/351,670

(22) Filed: Nov. 15, 2016

(65) Prior Publication Data

US 2018/0135440 A1    May 17, 2018

(51) Int. Cl.
| | |
|---|---|
| *F01D 5/32* | (2006.01) |
| *F01D 5/30* | (2006.01) |
| *F01D 5/18* | (2006.01) |

(52) U.S. Cl.
CPC .............. *F01D 5/323* (2013.01); *F01D 5/187* (2013.01); *F01D 5/3007* (2013.01); *F05D 2220/32* (2013.01); *F05D 2260/20* (2013.01); *F05D 2260/30* (2013.01)

(58) Field of Classification Search
CPC .......... F01D 5/082; F01D 5/081; F01D 5/066; F01D 5/30; F01D 5/3007; F01D 5/3015; F01D 5/323; F01D 5/326; F01D 11/006; F01D 11/001
See application file for complete search history.

(56) References Cited

U.S. PATENT DOCUMENTS

| | | | | |
|---|---|---|---|---|
| 3,216,699 | A | * 11/1965 | Schoenborn | ............ F01D 5/22 |
| | | | | 416/190 |
| 3,653,781 | A | * 4/1972 | Cooper | ................ F01D 5/323 |
| | | | | 416/221 |
| 4,669,959 | A | 6/1987 | Kalogeros | |
| 5,143,512 | A | 9/1992 | Corsmeier et al. | |
| | | (Continued) | | |

OTHER PUBLICATIONS

Government of India Ministry of Commerce & Industry The Patent Office, Permission Under Section 39 of The Patents Act 1970 (As Amended), Dated Aug. 11, 2016.

*Primary Examiner* — Ninh H. Nguyen
*Assistant Examiner* — Maxime M Adjagbe
(74) *Attorney, Agent, or Firm* — General Electric; Pamela Kachur

(57) ABSTRACT

Bayonet connection key includes upper and lower blocks shaped to be inserted one at a time into a key space, having laterally spaced apart upper and lower flat first and second side contact surfaces, and means for retaining blocks against each other. Bolt or screw may be disposed through an aperture in retaining plate and screwed into threaded hole in upper block pressing retaining plate against lower block. Upper block may include axially spaced apart upwardly extending forward and aft lugs, aft lug shorter than forward lug, and inwardly extending upper stop lug at aft end of upper block. Alternatively bendable tab extending axially forward from a front end of the lower block may be bent up contacting upper block for retaining blocks in key space. Upper block may include forward and aft lugs of same radial length and inwardly extending stop lug at aft end of lower block.

22 Claims, 6 Drawing Sheets

(56) References Cited

U.S. PATENT DOCUMENTS

| | | |
|---|---|---|
| 5,275,534 A | 1/1994 | Cameron et al. |
| 5,318,405 A | 6/1994 | Meade et al. |
| 6,106,234 A | 8/2000 | Gabbitas |
| 6,575,703 B2 | 6/2003 | Simeone et al. |
| 6,672,072 B1 | 1/2004 | Giffin, III |
| 6,960,060 B2 | 11/2005 | Lee |
| 8,439,635 B2 * | 5/2013 | Uskert .................... F01D 5/323 |
| | | 415/189 |

* cited by examiner

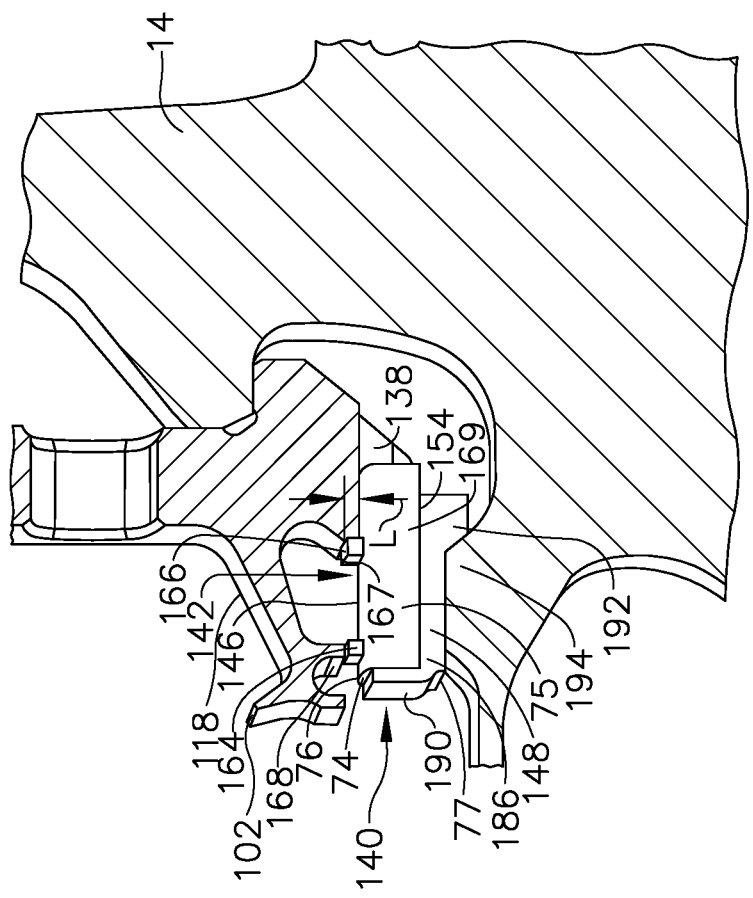
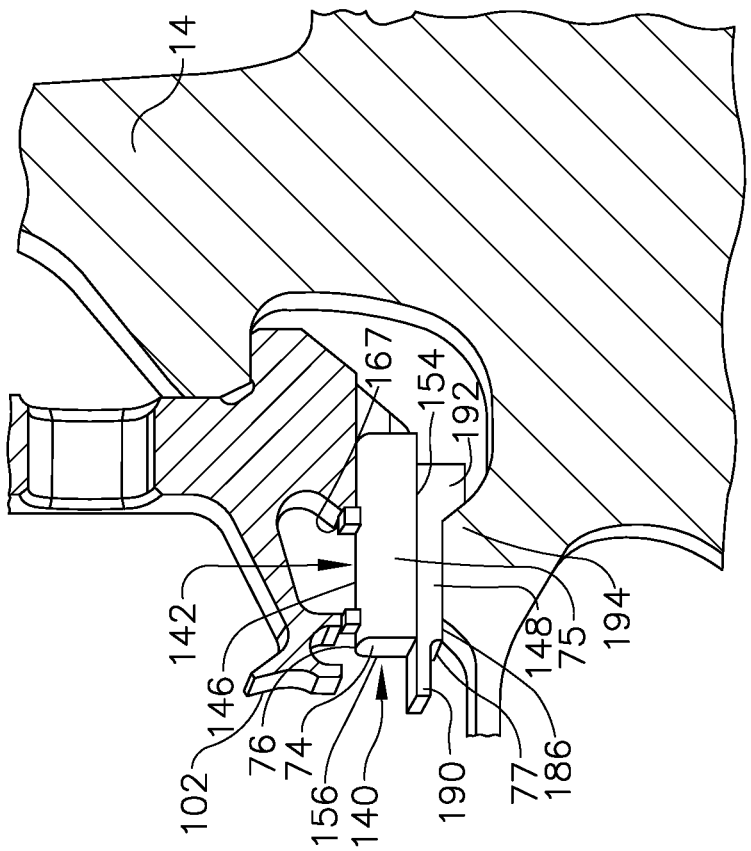

COMBINED BALANCE WEIGHT AND ANTI-ROTATION KEY

BACKGROUND OF THE INVENTION

The present invention relates generally to axial retention and anti-rotation of annular members mounted to turbine rotors and, more particularly, to keys to prevent rotation of forward outer seals mounted to a turbine disk.

Some turbine aircraft engines, particularly of the high bypass ratio type, includes multi-stage high pressure compressor and turbine sections interconnected by a central compression shaft or, in some models, a forward shaft. The high pressure turbine section typically includes first and second stage disks in which the second stage disk is attached to the first stage disk by a bolted connection. Forward and aft face plates attached to forward and aft faces of the first stage disk provides axial retention of first stage turbine blades radially retained in axially extending slots in a rim of the first stage disk. The forward face plate also helps define a cooling airflow path to the slots and has a forward outer seal mounted to it.

Bolted connections were used between components. Disadvantages of such bolted connections include bolt holes in the disks which create stress concentrations and limit the useful lives of the seals and disks. Furthermore, additional disk weight is required to sustain the stresses imposed by the bolt and bolt hole engagements. Another disadvantage with such bolted connections is that alignment of the first and second stage disks and seals is difficult to maintain during assembly and operation, which may result in excessive vibrations during operation. To overcome these and other disadvantages, boltless connections were developed, thereby eliminating the time-consuming task of properly torquing the bolts and eliminating the stress concentration problems associated with bolted connections.

Bayonet connections have been developed for preventing relative axial movement between the face plates and disks. Some of these boltless connections further provided anti-rotation features for preventing rotation of the members such as the face plates with respect to the first stage disk. These features included anti-rotation keys and axial retaining wires or rings. See U.S. Pat. No. 5,320,488, by Meade, et al., issued Jun. 14, 1994, and is entitled "Turbine Disk Interstage Seal Anti-rotation System" and U.S. Pat. No. 5,236,302, by Weisgerber, et al., issued Aug. 17, 1993, and is entitled "Turbine Disk Interstage Seal System", and U.S. Pat. No. 5,318,405, by Meade, et al., issued Jun. 7, 1994, and is entitled "Turbine Disk Interstage Seal Anti-rotation Key Through Disk Dovetail Slot".

U.S. Pat. No. 5,275,534, by Cameron, et al., issued Jan. 4, 1994, and is entitled "Turbine disk forward seal assembly". U.S. Pat. No. 5,275,534 discloses a turbine section having a disk and a forward seal assembly including a face plate. The face plate includes a plurality of radially inwardly-extending tabs shaped to engage radially outwardly-extending tabs located on the web to form a bayonet connection. Locking pins are arranged to balance the assembly. Relative circumferential movement is prevented by locking pins, secured by a split ring, in between the tabs of the bayonet engagement or alternatively a locking cylinder instead of the locking pins.

Some anti-rotation systems include a key positioned in at least one slot in the plate and a tab for interconnecting with a slot formed in the bayonet connection. The key prevents relative circumferential movement and a seal plate is provided for retaining the key in the interconnected position between the face plate and the disk.

The retaining rings and seal plates have significant amounts of weight. The anti-rotation keys have complicated designs and are not easy to manufacture. Different engines across an engine line often need retaining rings and seal plates with different sizes and shapes which adds cost to the manufacture and servicing and repair of the engine. It is desirable to make the turbine design less costly to manufacture and service, to make it lighter in weight, and more simple to manufacture and service.

BRIEF DESCRIPTION OF THE INVENTION

A bayonet connection key including complimentary upper and lower blocks shaped to be inserted one at a time into a key space, the upper and lower blocks having laterally spaced apart upper and lower flat first and second side contact surfaces respectively, and an axial retaining means for axially retaining the upper and lower blocks axially against each other.

The axial retaining means may include a bolt or screw disposed through an aperture in a retaining plate and the bolt or screw screwed into a threaded hole in the upper block securing the retaining plate to the upper block and pressing the retaining plate against the lower block. The upper block may include longitudinally or axially spaced apart upwardly extending forward and aft lugs, the aft lug shorter than the forward lug, and a radially inwardly extending upper stop lug at an aft end of the upper block.

The axial retaining means may include a bendable tab extending axially forward from a front end of the lower block and the bendable tab being bent up contacting the upper block for retaining the upper and lower block in the key space. The upper block may include longitudinally or axially spaced apart upwardly extending forward and aft lugs, the forward and aft lugs having the same radial length, and a radially inwardly extending lower stop lug at an aft end of the lower block.

A bayonet connection including circumferentially spaced apart radially inwardly extending tabs axially engaging circumferentially spaced apart radially outwardly extending tabs, the outwardly and inwardly extending tabs being circumferentially aligned, and a key inserted in a key space between at least one pair of the circumferentially aligned outwardly and inwardly extending tabs. The key includes complimentary upper and lower blocks shaped to be inserted one at a time into the key space and the space and the combined or assembled upper and lower blocks being not round in cross-section for preventing rotation of the key in the key space.

A turbine section including a first stage disk having a first web extending radially outwardly from a first disk bore to a first disk rim, first blade dovetail slots disposed through the first disk rims, first stage blades secured by their dovetail roots in the first blade dovetail slots, an annular face plate mounted to the first stage disk by radially inner and outer bayonet connections at radially inner and outer peripheries of the face plate respectively, and the face plate including a blade retaining outer rim that contacts the first stage blades for axially retaining the first stage blades in the first blade dovetail slots. The face plate including a plate web extending radially outwardly from a plate bore to the plate outer rim and defining, at least in part, a cooling airflow path to the dovetail slots between the face plate and the first stage disk, and the inner and outer bayonet connections connecting and securing the face plate to the first stage disk near the first web radially outwardly of the first disk bore and to the first disk rim of the first stage disk respectively. The inner bayonet connection including a plurality of radially outwardly extending tabs attached to the first stage disk engaging radially inwardly extending tabs extending inwardly from the inner periphery around the plate bore, a key inserted in a key space between at least one pair of the circumferentially aligned outwardly and inwardly extending tabs, the key including complimentary upper and lower blocks shaped to be inserted one at a time into the key space, and the space and the combined or assembled upper and lower blocks being not round in cross-section for preventing rotation of the key in the key space.

An axial retaining means for axially retaining the upper and lower blocks axially against each other amy include a bolt or screw disposed through an aperture in a retaining plate and the bolt or screw screwed into a threaded hole in the upper block securing the retaining plate to the upper block, pressing the retaining plate against the lower block, and trapping or retaining the upper and lower block in the key space. The upper block may include longitudinally or axially spaced apart upwardly extending forward and aft lugs, the aft lug shorter than the forward lug and abutting a flat surface or flat face rim around the plate bore, the forward lug aft of and radially overlapping a radially inwardly extending flange extending radially inwardly from a plate arm of the face plate, and the upper block including a radially inwardly extending upper stop lug at an aft end of the upper block.

The radially outwardly extending tabs may extend radially outwardly from a forward shaft integral with and extending forward from the first stage disk.

A forward seal assembly including one or more forward seals may be mounted on the face plate, a plurality of axial openings may be disposed through the face plate adjacent to the inner periphery and operable for receiving cooling air from a stationary, multiple-orifice duct attached to non-rotating static structure connected to a high pressure turbine nozzle upstream from the first stage disk, radially inner seal teeth of the radially inner seal may extend radially outwardly from the plate arm, and a radially inner seal land of the radially inner seal may extend radially inwardly from the multiple-orifice duct and be in sealing engagement relationship with the inner seal teeth.

BRIEF DESCRIPTION OF THE DRAWINGS

FIG. 5 is a perspective view illustration of a face plate to disk connection with an alternative key having a bendable locking tab in the turbine section illustrated in FIG. 1.

FIG. 6 is a perspective view illustration of tab bent on the key illustrated in FIG. 5.

DETAILED DESCRIPTION OF THE INVENTION

Figure 1:
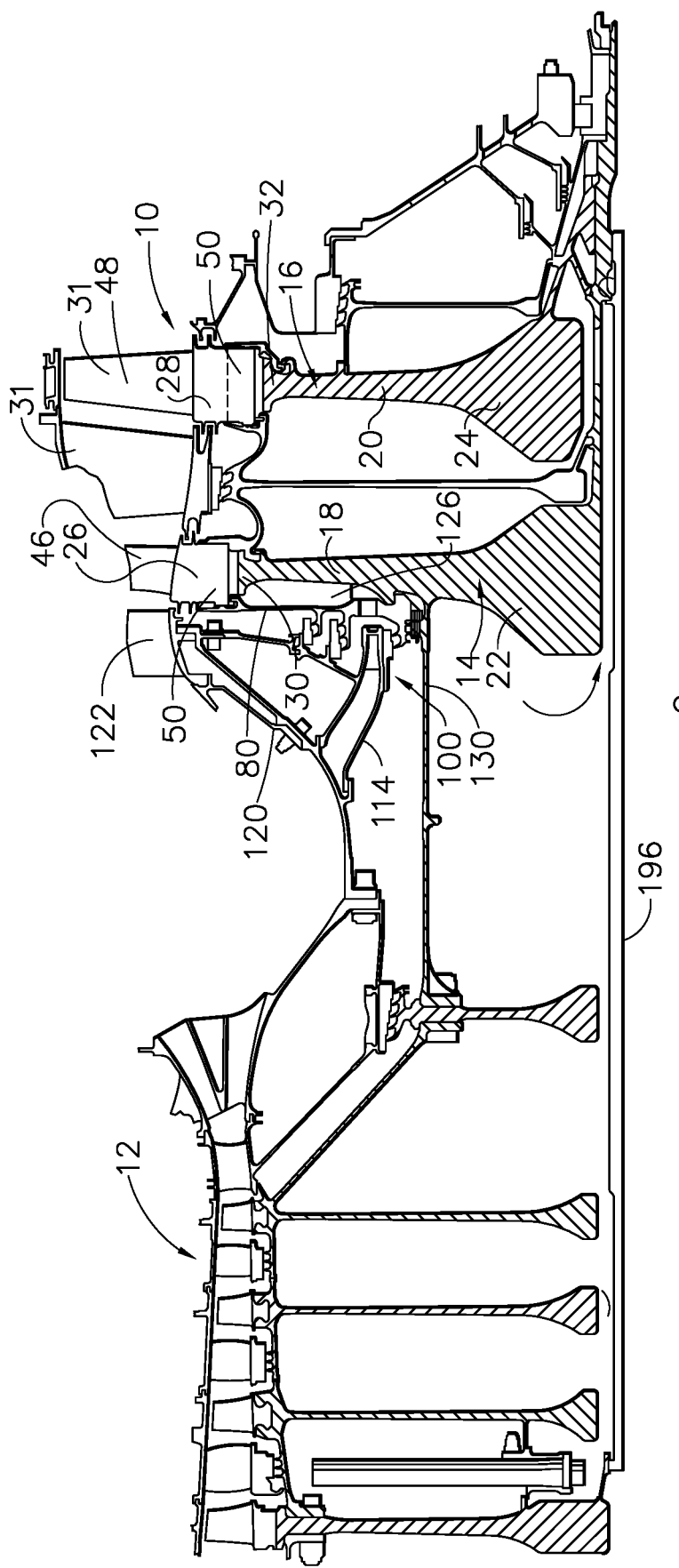
FIG. 1 is a cross-sectional view illustration of a portion of an exemplary high pressure turbine section of a gas turbine engine with a two piece anti-rotation key.

Illustrated in FIG. 1 are a high pressure turbine section 10 and a high pressure compressor section 12 of an aircraft high bypass ratio gas turbine engine circumscribed about an engine centerline C. The turbine section 10 is illustrated as including first and second stage disks 14, 16, having first and second webs 18, 20 extending radially outward from first and second disk bores 22, 24 to first and second disk rims 30, 32 respectively. First and second pluralities of first and second blade dovetail slots 26, 28 are disposed through the first and second disk rims 30, 32. First and second stage blades 46, 48 are secured by their dovetail roots 50 in the first and second blade dovetail slots 26, 28 respectively.

Figure 2:
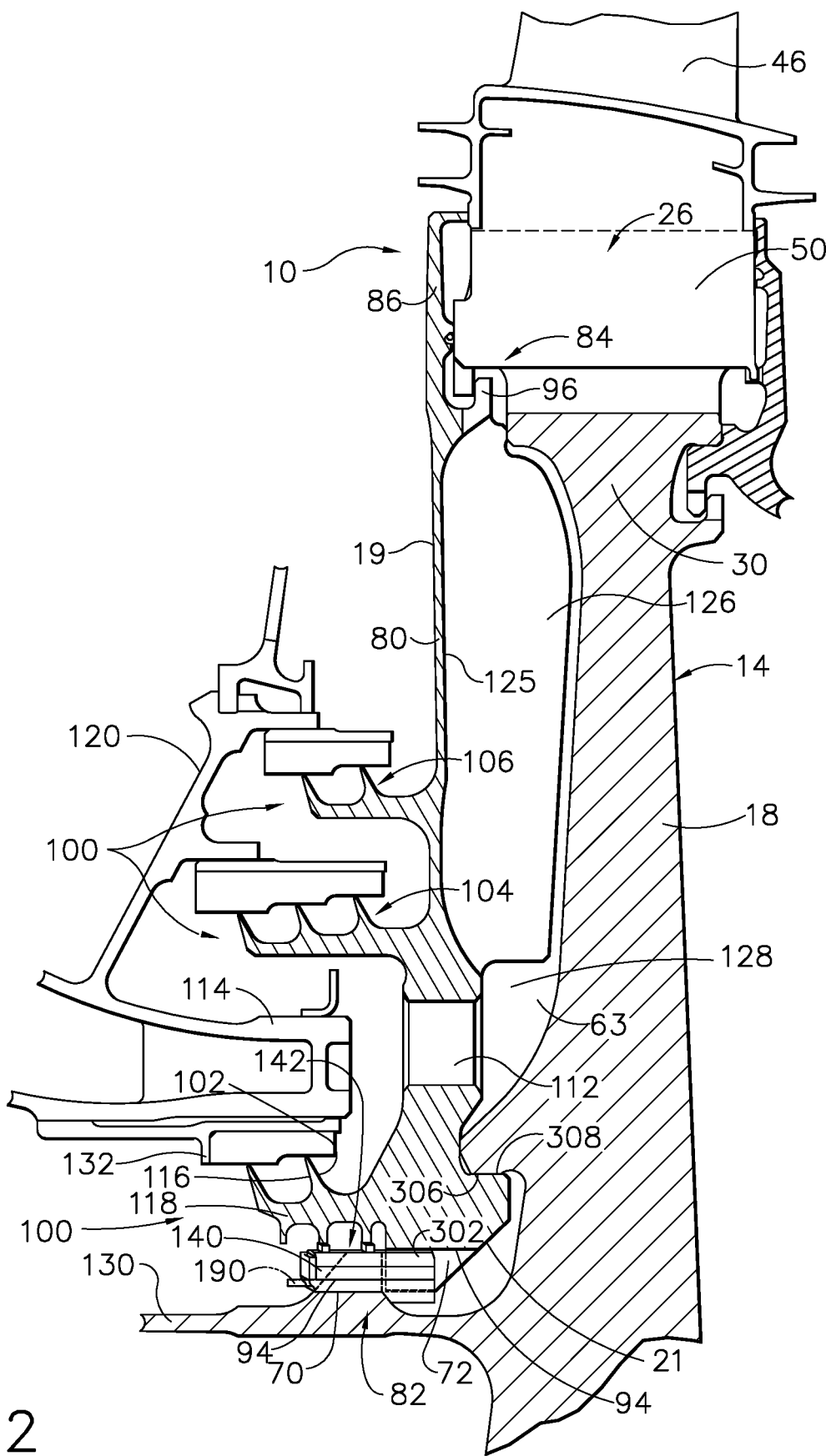
FIG. 2 is a perspective view illustration of a boltless face plate to disk connection with the key in the turbine section illustrated in FIG. 1.
Figure 3:
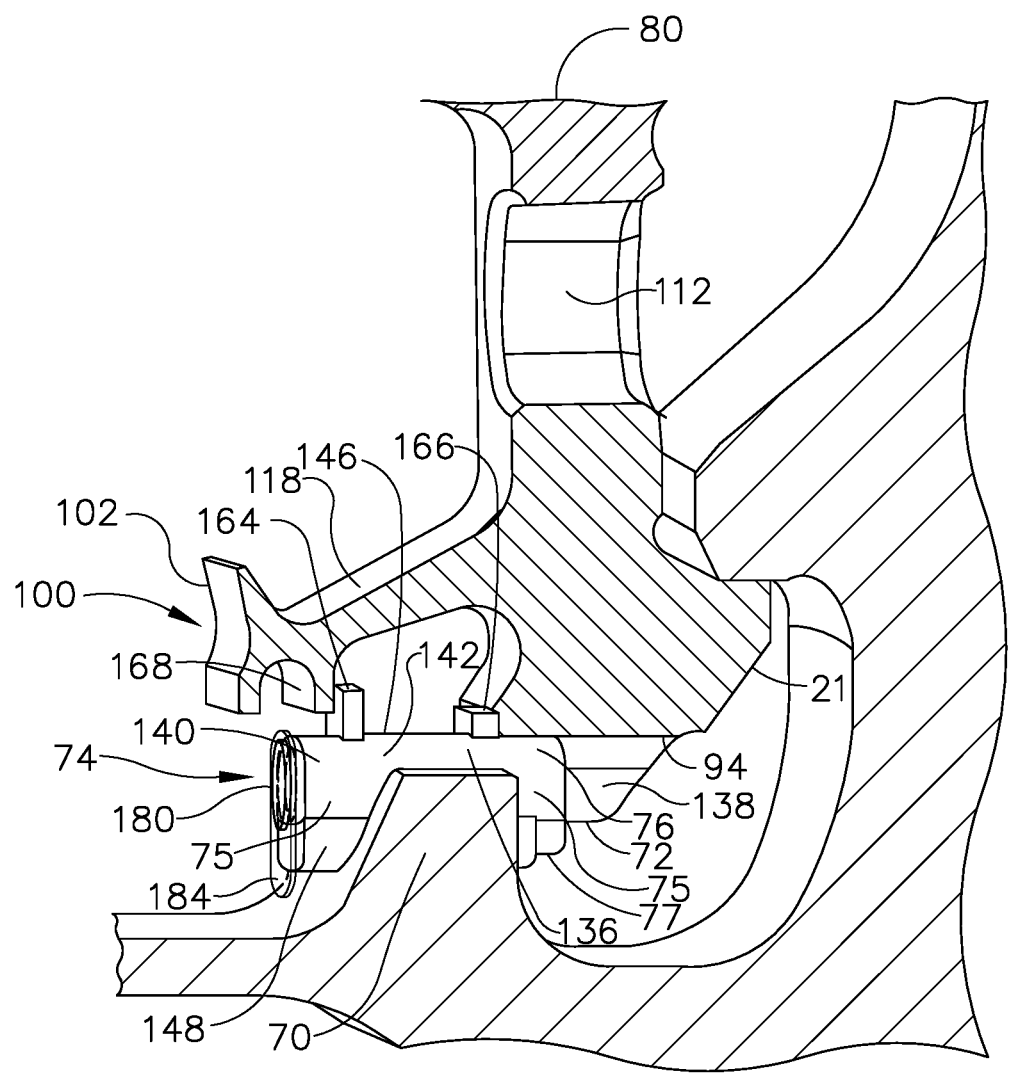
FIG. 3 is a perspective view illustration of a key assembly with the key illustrated in FIG. 2.
Figure 4:
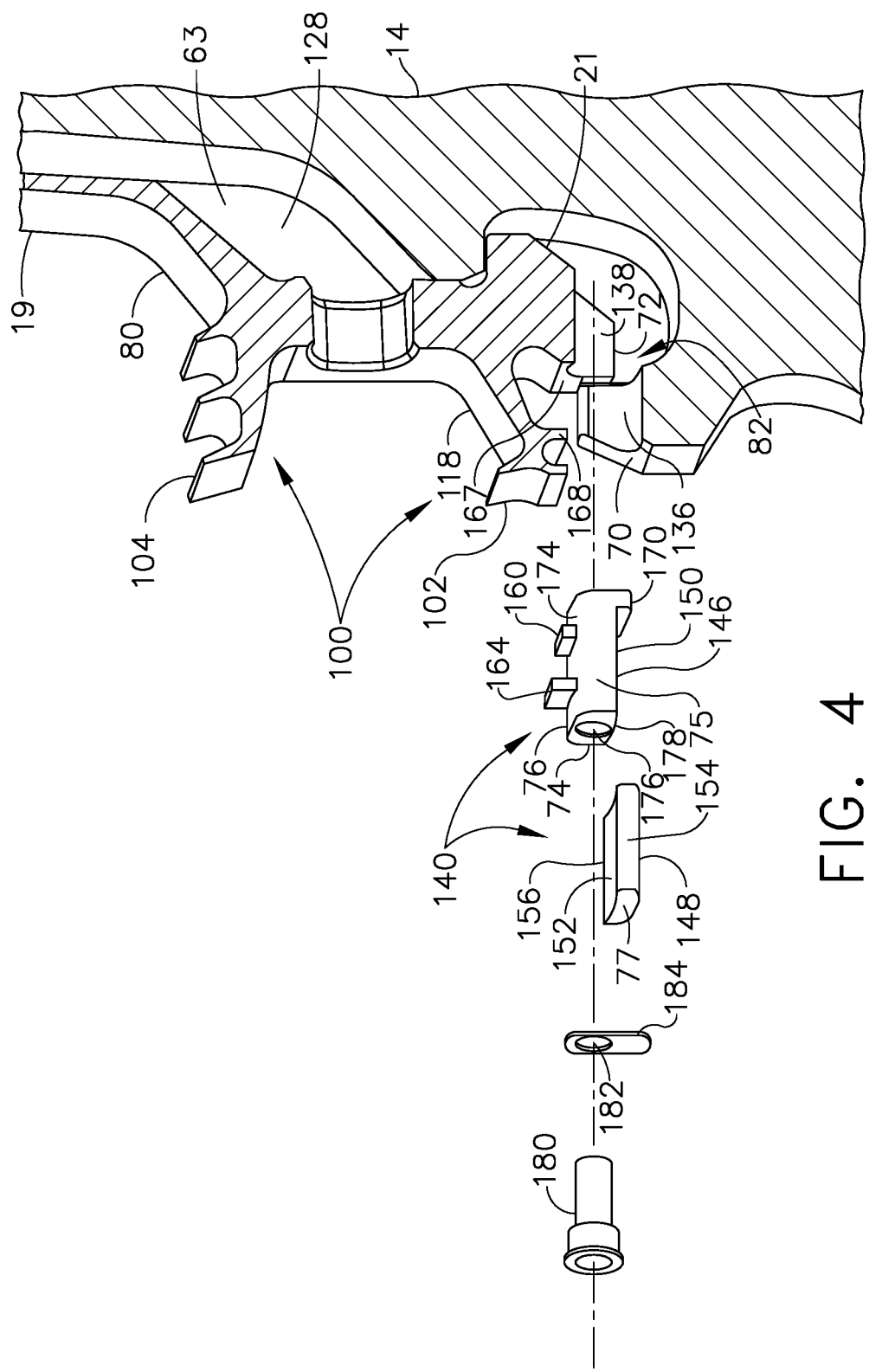
FIG. 4 is an exploded perspective view illustration of a key assembly with the key illustrated in FIG. 3.

Further referring to FIGS. 2-4, an annular face plate 80 is mounted to the first stage disk 14 by radially inner and outer bayonet connections 82, 84 at radially inner and outer peripheries 94, 96 of the face plate 80 respectively. The face plate 80 includes a blade retaining outer rim 86 that contacts the first stage blades 46 and helps to axially retain them in the first blade dovetail slots 26. The face plate 80 includes a plate web 19 extending radially outwardly from a plate bore 21 to the plate outer rim 86. The face plate 80 defines in part, a cooling airflow path 63 to the dovetail slots 26 between the face plate 80 and the first stage disk 14. The outer rim 86 of the face plate 80 axially retains the dovetail roots 50 of the first stage blades 46 in the first blade dovetail slots 26.

The radially spaced apart inner and outer bayonet connections 82, 84 at the inner and outer peripheries 94, 96 of the face plate 80 connects and secures the face plate 80 to the first stage disk 14 near the first web 18 radially outwardly of the first disk bore 22 and to the first disk rim 30 of the first stage disk 14 respectively.

The inner bayonet connection 82 includes a plurality of radially outwardly extending tabs 70 attached to the first stage disk 14 engaging radially inwardly extending tabs 72 extending inwardly from the inner periphery 94 around the plate bore 21. Accordingly, the inner bayonet connection 82 prevents relative axial movement between the face plate 80 and the first stage disk 14. The turbine section 10 includes a forward seal assembly 100 including radially inner, intermediate, and outer forward seals 102, 104, 106 mounted on the face plate 80. The face plate 80 includes a plurality of axial openings 112 adjacent to the inner periphery 94 which receive cooling air from a stationary, multiple-orifice duct 114 attached to non-rotating static structure 120 which is connected to a high pressure turbine nozzle 122 upstream from the first stage blades 46 mounted on or carried by the first stage disk 14.

An interior rearward or aft facing surface 125 of the face plate 80 includes a plurality of radially-extending guide vanes 126 which extend from the openings 112 to the outer bayonet connection 84. The guide vanes 126 direct cooling air through an annular volume 128, axially disposed between the face plate 80 and the first web 18 of the first stage disk 14, radially outwardly to the dovetail blade roots 50 where it cools the blades and passes through blade passages (not shown). Radially inner seal teeth 116 of the radially inner seal 102 extend radially outwardly from the plate arm 118 extending forwardly from and mounted on the face plate 80. A radially inner seal land 132 of the radially inner seal 102 extends radially inwardly from the multiple-orifice duct 114 and is in sealing engagement relationship with the inner seal teeth 116.

The inner bayonet connection 82 includes the circumferentially spaced apart radially inwardly extending tabs 72 extending radially inwardly from the plate bore 21 of the face plate 80. The inner bayonet connection 82 further includes the circumferentially spaced apart radially outwardly extending tabs 70 extending radially outwardly from a forward shaft 130 integral with and extending forward from the first web 18 of the first disk 14. The forward shaft 130 is drivingly connected to the high pressure compressor section 12. Engagement of the outwardly and inwardly extending tabs 70, 72 prevents forward axial movement of face plate 80 relative to the first disk 14.

Relative circumferential movement between the face plate 80 and the first disk 14 is prevented by one or more keys 140 inserted in one or more corresponding key spaces 142 between pairs of the aligned outwardly and inwardly extending tabs 70, 72. Each key space 142 includes a forward space 136 between an adjoining pair of outwardly extending tabs 70 and an aft space 138 between an adjoining pair of inwardly extending tabs 72. Preferably, between two to four keys 140 may be employed and are spaced at intervals about the inner periphery of face plate 80 so as to offset any imbalance of the face plate. Conventional anti-rotation keys are difficult to manufacture and require retaining rings and machined grooves in the forward seal assembly or face plate. The key 140 extends through the forward space 136 and into the aft space 138 of the key spaces 142.

Figure 2A:
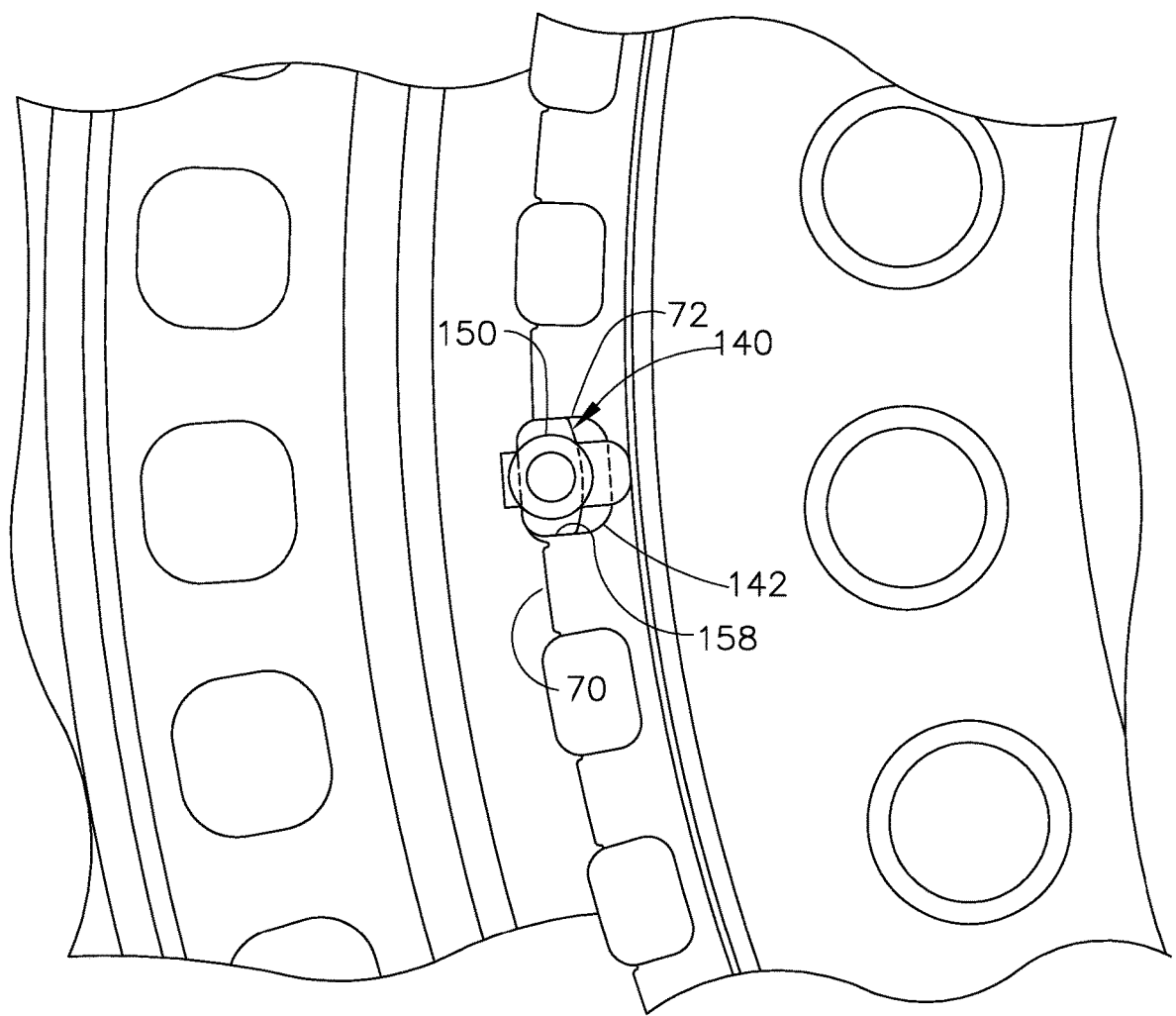
FIG. 2A is a forward looking aft axial view illustration of the key in a key space between pairs of aligned outwardly and inwardly extending tabs of a radially inner bayonet connection illustrated in FIG. 2.

Illustrated in FIGS. 2A, 3, and 4 is a first embodiment of the key 140 disclosed herein which includes complimentary upper and lower blocks 146, 148. The upper and lower blocks 146, 148 are shaped to be inserted one at a time into the key spaces 142. The space 142 and the combined or assembled upper and lower blocks 146, 148 are elongated, not round, to prevent rotation of the key 140 when inserted in the key space 142. The illustrated shape of the combined upper and lower blocks 146, 148 has a race track shaped cross-section 74 including a rectangular section 75 longitudinally or radially disposed between spaced apart rounded or semi-circular outer and inner or top and bottom end sections 76, 77. The upper and lower blocks 146, 148 have upper and lower mating surfaces 150, 152 and laterally spaced apart upper and lower flat first and second side contact surfaces 154, 156 respectively along the rectangular section 75. The upper and lower flat first and second side contact surfaces 154, 156 are shaped and sized to contact laterally spaced apart flat first and second key space side surfaces 158, 160 respectively of the key space 142. These flat surfaces and sides are designed to prevent rotation of the key 140 in the key space 142.

The upper block 146 includes longitudinally or axially spaced apart upwardly extending forward and aft lugs 164, 166 that are sufficiently axially spaced apart to fit in the key space 142 between the plate bore 21 and a radially inwardly extending flange 168 extending radially inwardly from the plate arm 118 of the face plate 80. The aft lug 166 is shorter than the forward lug 164 and abuts a flat surface or flat face rim 167 around the plate bore 21. The forward lug 164 is aft of and radially overlaps the radially inwardly extending flange 168. This axially traps the upper block 146. The upper block 146 further includes a radially inwardly extending upper stop lug 170 illustrated in the exemplary embodiment of the key as being at an aft end 174 of the upper block 146. A threaded hole 176 extends into the upper block 146 from a forward end 178 of the upper block 146. The lower block 148 is held in place and contact with the upper block 146 by a bolt or screw 180 disposed through an aperture 182 in a retaining plate 184 and screwed into the threaded hole 176. The retaining plate 184 presses against and traps the lower block 148 in the key spaces 142 and axially against the upper stop lug 170 of the upper block 146.

The upper block 146 is inserted first and is raised or moved radially outwardly and placed at an uppermost or outermost position in the key space 142 with the forward and aft lugs 164, 166 between the plate bore 21 and the radially inwardly extending flange 168. Then the lower block 148 is inserted or slid into the key space 142 and is slid aftwardly until it contacts and stops against the upper stop lug 170 of the upper block 146. The bolt or screw 180 is inserted through the aperture 182 in the retaining plate 184 and screwed into the threaded hole 176, thus, trapping the lower block 148 in the key spaces 142 and axially against the stop lug 170 of the upper block 146 with the retaining plate 184.

Illustrated in FIGS. 5 and 6 is a second embodiment of the key 140 disclosed herein which includes complimentary upper and lower blocks 146, 148. The upper and lower blocks 146, 148 are shaped to be inserted one at a time into the key spaces 142. The space 142 and the combined or assembled upper and lower blocks 146, 148 are radially elongated, not round, to prevent rotation of the key 140 when inserted in the key space 142. The illustrated shape of the combined upper and lower blocks 146, 148 has a race track shaped cross-section 74 including a rectangular section 75 longitudinally or radially disposed between spaced apart rounded or semi-circular outer and inner or top and bottom end sections 76, 77. The upper and lower blocks 146, 148 have upper and lower mating surfaces 150, 152 and laterally spaced apart upper and lower flat first and second side contact surfaces 154, 156 respectively along the rectangular section 75. The upper and lower flat first and second side contact surfaces 154, 156 are shaped and sized to contact laterally spaced apart flat first and second key space side surfaces 158, 160 respectively of the key space 142. These flat surfaces and sides are designed to prevent rotation of the key 140 in the key space 142.

The upper block 146 includes longitudinally or axially spaced apart upwardly extending forward and aft lugs 164, 166 that are sufficiently axially spaced apart to fit in the key space 142 between the plate bore 21 and a radially inwardly extending flange 168 extending radially inwardly from and mounted on the plate arm 118 of the face plate 80. The forward and aft lugs 164, 166 have the same radial length L. The aft lug 166 axially abuts a flat surface or flat face rim 167 around the plate bore 21. The forward lug 164 axially aligned with and radially abuts the radially inwardly extending flange 168. An upper block aft end 169 extends aftwardly past the aft lug 166 into the aft space 138 between the adjoining pair of inwardly extending tabs 72. This radially and helps axially trap the upper block 146. The lower block 148 is held in place and contact with the upper block 146 by a bendable tab 190 extending axially forward from a front end 186 of the lower block 148. The lower block 148 further includes a radially inwardly extending lower stop lug 192 illustrated in the exemplary embodiment of the key as being at an aft end 174 of the lower block 148. The lower stop lug 192 axially engages an annular ridge 194 around the forward shaft 130. The radially outwardly extending tabs 70 extend radially outwardly from annular ridge 194. When the bendable tab 190 is bent up, it contacts the upper block 146 and traps the upper and lower block 146, 148 in the key spaces 142 and axially against the lower stop lug 192 of the lower block 148.

The lower block 148 with the bendable tab 190 in the straight or bent position as illustrated in FIG. 5 is inserted in the key space 142 first. Then the upper block 146 is inserted or slid into the key space 142 and is slid aftwardly until the aft lug 166 contacts and stops against the flat surface or flat face rim 167 around the plate bore 21. Then the bendable tab 190 is bent upwards to contact the upper block 146 thus trapping the upper and lower blocks 146, 148 in the key space 142.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A bayonet connection key comprising:
   complimentary upper and lower blocks shaped to be inserted one at a time into a key space,
   the upper and lower blocks having laterally spaced apart upper and lower flat first and second side contact surfaces respectively, the upper block further including longitudinally or axially spaced apart upwardly extending forward and aft lugs and a radially inwardly extending upper stop lug at an aft end of the upper block, and
   an axial retaining means for axially retaining the upper and lower blocks axially against each other.

2. The key as claimed in claim 1, further comprising the axial retaining means including a bolt or screw disposed through an aperture in a retaining plate, the bolt or screw screwed into a threaded hole in the upper block securing the retaining plate to the upper block and pressing the retaining plate against the lower block.

3. The key as claimed in claim 2,
   wherein the aft lug is shorter than the forward lug.

4. The key as claimed in claim 1, further comprising the axial retaining means including a bendable tab extending axially forward from a front end of the lower block and the bendable tab being bent up contacting the upper block for retaining the upper and lower block in the key space.

5. The key as claimed in claim 4,
   wherein the forward and aft lugs have the same radial length.

6. A bayonet connection comprising:
   circumferentially spaced apart radially inwardly extending tabs axially engaging circumferentially spaced apart radially outwardly extending tabs,
   the outwardly and inwardly extending tabs being circumferentially aligned,
   a key inserted in a key space between at least one pair of the circumferentially aligned outwardly and inwardly extending tabs,
   the key including complimentary upper and lower blocks shaped to be inserted one at a time into the key space, the upper block including longitudinally or axially spaced apart upwardly extending forward and aft lugs and a radially inwardly extending upper stop lug at an aft end of the upper block, and
   the space and the combined or assembled upper and lower blocks being not round in cross-section for preventing rotation of the key in the key space.

7. The bayonet connection as claimed in claim 6, further comprising the upper and lower blocks having laterally spaced apart upper and lower flat first and second side contact surfaces respectively.

8. The bayonet connection as claimed in claim 7, further comprising an axial retaining means for axially retaining the upper and lower blocks axially against each other.

9. The bayonet connection as claimed in claim 8, further comprising the axial retaining means including a bolt or screw disposed through an aperture in a retaining plate, the bolt or screw screwed into a threaded hole in the upper block securing the retaining plate to the upper block, pressing the retaining plate against the lower block, and trapping or retaining the upper and lower block in the key space.

10. The bayonet connection as claimed in claim 9,
    wherein the aft lug is shorter than the forward lug.

11. The bayonet connection as claimed in claim 8, further comprising the axial retaining means including a bendable tab extending axially forward from a front end of the lower block and the bendable tab being bent up contacting the upper block and trapping or retaining the upper and lower block in the key space.

12. The bayonet connection as claimed in claim 11,
    wherein the forward and aft lugs having the same radial length.

13. A turbine section comprising:
    a first stage disk having a first web extending radially outwardly from a first disk bore to a first disk rim,
    first blade dovetail slots disposed through the first disk rim, first stage blades secured by their dovetail roots in the first blade dovetail slots,
    an annular face plate mounted to the first stage disk by radially inner and outer bayonet connections at radially inner and outer peripheries of the face plate respectively,
    the face plate including a blade retaining outer rim that contacts the first stage blades for axially retaining the first stage blades in the first blade dovetail slots,
    the face plate including a plate web extending radially outwardly from a plate bore to the blade retaining outer rim of the face plate and defining, at least in part, a cooling airflow path to the dovetail slots between the face plate and the first stage disk,
    the inner and outer bayonet connections connecting and securing the face plate to the first stage disk near the first web radially outwardly of the first disk bore and to the first disk rim of the first stage disk respectively,
    the inner bayonet connection including a plurality of radially outwardly extending tabs attached to the first stage disk engaging radially inwardly extending tabs extending inwardly from the inner periphery around the plate bore,
    a key inserted in a key space between at least one pair of the circumferentially aligned outwardly and inwardly extending tabs,
    the key including complimentary upper and lower blocks shaped to be inserted one at a time into the key space, the upper block including longitudinally or axially spaced apart upwardly extending forward and aft lugs and a radially inwardly extending upper stop lug at an aft end of the upper block, and
    the space and the combined or assembled upper and lower blocks being not round in cross-section for preventing rotation of the key in the key space.

14. The turbine section as claimed in claim 13, further comprising the upper and lower blocks having laterally spaced apart upper and lower flat first and second side contact surfaces respectively.

15. The turbine section as claimed in claim 14, further comprising:
an axial retaining means for axially retaining the upper and lower blocks axially against each other,
the axial retaining means including a bolt or screw disposed through an aperture in a retaining plate, and
the bolt or screw screwed into a threaded hole in the upper block securing the retaining plate to the upper block, pressing the retaining plate against the lower block, and trapping or retaining the upper and lower block in the key space.

16. The turbine section as claimed in claim 15, wherein the aft lug is shorter than the forward lug and abuts a flat surface or flat face rim around the plate bore, the forward lug being aft of and radially overlapping a radially inwardly extending flange extending radially inwardly from a plate arm of the face plate.

17. The turbine section as claimed in claim 14, further comprising:
an axial retaining means for axially retaining the upper and lower blocks axially against each other,
the axial retaining means including a bendable tab extending axially forward from a front end of the lower block, and
the bendable tab being bent up contacting the upper block and trapping or retaining the upper and lower block in the key space.

18. The turbine section as claimed in claim 13, further comprising the radially outwardly extending tabs extending radially outwardly from a forward shaft integral with and extending forward from the first stage disk.

19. The turbine section as claimed in claim 18, further comprising:
a forward seal assembly including one or more forward seals mounted on the face plate,
a plurality of axial openings in the face plate adjacent to the inner periphery and operable for receiving cooling air from a stationary, multiple-orifice duct attached to non-rotating static structure connected to a high pressure turbine nozzle upstream from the first stage blades mounted on the first stage disk,
radially inner seal teeth of a radially inner seal extending radially outwardly from a plate arm, and
a radially inner seal land of the radially inner seal extending radially inwardly from the multiple-orifice duct and in sealing engagement relationship with the inner seal teeth.

20. The turbine section as claimed in claim 19, further comprising:
an axial retaining means for axially retaining the upper and lower blocks axially against each other,
the axial retaining means including a bolt or screw disposed through an aperture in a retaining plate, and
the bolt or screw screwed into a threaded hole in the upper block securing the retaining plate to the upper block, pressing the retaining plate against the lower block, and trapping or retaining the upper and lower block in the key space.

21. The turbine section as claimed in claim 20, wherein the aft lug is shorter than the forward lug and abuts a flat surface or flat face rim around the plate bore, the forward lug being aft of and radially overlapping the radially inwardly extending flange.

22. The turbine section as claimed in claim 19, further comprising:
an axial retaining means for axially retaining the upper and lower blocks axially against each other,
the axial retaining means including a bendable tab extending axially forward from a front end of the lower block, and
the bendable tab being bent up contacting the upper block and trapping or retaining the upper and lower block in the key space.

* * * * *